United States Patent
Yano et al.

(10) Patent No.: US 9,677,692 B2
(45) Date of Patent: Jun. 13, 2017

(54) WELDED STEEL PIPE JOINED WITH HIGH-ENERGY-DENSITY BEAM AND METHOD FOR PRODUCING THE SAME

(71) Applicant: JFE Steel Corporation, Tokyo (JP)

(72) Inventors: Koji Yano, Chiba (JP); Kenji Oi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 169 days.

(21) Appl. No.: 14/591,431

(22) Filed: Jan. 7, 2015

(65) Prior Publication Data

US 2015/0204464 A1     Jul. 23, 2015

Related U.S. Application Data

(62) Division of application No. 12/933,241, filed as application No. PCT/JP2009/057013 on Mar. 30, 2009, now Pat. No. 8,993,920.

(30) Foreign Application Priority Data

Mar. 31, 2008  (JP) ................................. 2008-091928
Jul. 30, 2008   (JP) ................................. 2008-196117

(51) Int. Cl.
   *F01D 5/18*     (2006.01)
   *F16L 9/02*     (2006.01)
   (Continued)

(52) U.S. Cl.
   CPC ............ *F16L 9/02* (2013.01); *B21C 37/0811* (2013.01); *B23K 13/046* (2013.01);
   (Continued)

(58) Field of Classification Search
   None
   See application file for complete search history.

(56) References Cited

U.S. PATENT DOCUMENTS 3,015,017 A  12/1961  Rudd
3,437,787 A   4/1969  Chyle
(Continued)

FOREIGN PATENT DOCUMENTS

DE      10037109 A1    2/2002
FR      2529107 A1    12/1983
(Continued)

OTHER PUBLICATIONS

International Search Report Dated Jul. 14, 2009, application No. PCT/JP2009/057013.
(Continued)

*Primary Examiner* — Humera Sheikh
*Assistant Examiner* — Seth Dumbris
(74) *Attorney, Agent, or Firm* — RatnerPrestia

(57) ABSTRACT

A steel strip is formed into a cylinder so that opposite ends of the steel strip face each other, while continuously conveying the steel strip. The opposite ends are melted across the entire thickness by irradiating the opposite ends with a high-energy-density beam while applying a pressure with squeeze rolls. A seam is formed by joining the opposite ends, and excess weld metal of the seam on the outer and inner sides of the obtained welded steel pipe is removed by cutting. A repaired seam is then formed by remelting and solidifying a region on the inner side of the welded steel pipe, the region having a depth of 0.5 mm or more from the surface and a width of double or more the width of the seam, and in addition, the center line of the seam is made to coincide with the center line of the repaired seam.

3 Claims, 3 Drawing Sheets

(51) Int. Cl.
  *B21C 37/08* (2006.01)
  *B23K 13/04* (2006.01)
  *B23K 26/262* (2014.01)
  *B23K 101/06* (2006.01)
  *B23K 103/04* (2006.01)

(52) U.S. Cl.
  CPC ........ *B23K 26/262* (2015.10); *B23K 2201/06* (2013.01); *B23K 2203/04* (2013.01); *B23K 2203/05* (2015.10)

(56) References Cited

U.S. PATENT DOCUMENTS

| | | | |
|---|---|---|---|
| 5,900,079 A | 5/1999 | Ono et al. | |
| 5,961,748 A | 10/1999 | Ono et al. | |
| 5,968,380 A | 10/1999 | Hayashi et al. | |
| 2004/0099644 A1* | 5/2004 | Allen | B21C 37/0811 219/121.64 |
| 2004/0234715 A1* | 11/2004 | Gandy | B21C 37/08 428/36.9 |

FOREIGN PATENT DOCUMENTS

| | | | |
|---|---|---|---|
| JP | 60-046890 | 3/1985 | |
| JP | 03-291176 | 12/1991 | |
| JP | 7-290261 A | 11/1995 | |
| JP | 08155665 | 6/1996 | |
| JP | 8-168892 A | 7/1996 | |
| JP | 08-174249 | 7/1996 | |
| JP | 9-170050 A | 6/1997 | |
| JP | 9-279324 A | 10/1997 | |
| JP | 2001287061 | 10/2001 | |
| JP | 2006-150412 | 6/2006 | |
| JP | 2006150412 | * 6/2006 | ............. B21C 37/08 |

OTHER PUBLICATIONS

Supplemental European Search Report dated Nov. 14, 2013, application No. EP09727339.
European Office Action for Application No. 09 727 339.5, dated May 12, 2014, 5 pages.
Japanese Office Action with partial English language translation for Application No. 2009-086366, dated Jul. 16, 2013, 3 pages.

* cited by examiner

WELDED STEEL PIPE JOINED WITH HIGH-ENERGY-DENSITY BEAM AND METHOD FOR PRODUCING THE SAME

CROSS-REFERENCE TO RELATED APPLICATIONS

This application is a divisional application of U.S. patent application Ser. No. 12/933,241, filed Sep. 17, 2010, which is the U.S. National Phase Application of PCT International Application No. PCT/JP2009/057013, filed Mar. 30, 2009, and claims priority to Japanese Patent Application No. 2008-09128, filed Mar. 31, 2008; and Japanese Patent Application No. 2008-196117, filed Jul. 30, 2008, the disclosures of which PCT, parent, and priority applications are incorporated herein by reference in their entirety for all purposes.

TECHNICAL FIELD

The present invention relates to a method for producing a welded steel pipe, and in particular, to a method for producing a welded steel pipe that is welded by applying a high-energy-density beam.

BACKGROUND OF THE INVENTION

In producing a welded steel pipe by forming a steel strip into a cylinder while continuously conveying the steel strip so that opposite ends of the steel strip are made to face each other, and welding the joint (so-called "seam"), various welding technologies are in practical use. Among such welding technologies, high-frequency resistance welding (so-called "electric resistance welding") is a technology with which the seam can be most efficiently joined.

The electric resistance welding is a technology in which welding is conducted by heating opposite ends of a steel strip using an induction coil (performing so-called "high-frequency induction resistance heating") or heating opposite ends of a steel strip by supplying a high frequency electric current to the opposite ends through a contact tip (performing so-called "high frequency contact resistance heating"), and applying a pressure to the molten opposite ends of the steel strip with squeeze rolls while eliminating impurities and oxides in the molten metal. The electric resistance welding has an advantage that a welded steel pipe can be efficiently produced. However, when opposite ends of a steel strip are made to face each other and melted by heating, alloying components, such as Mn, Si, and Cr, in the molten metal tend to combine with oxygen in the atmosphere to produce high melting point oxides. Such high melting point oxides remain inside the seam to generate a welding defect called penetrator.

Consequently, to suppress the generation of such high melting point oxides, a technology in which a molten metal is shielded with an inert gas (so-called "gas shielded method") has been studied. However, since oxidation of alloying components in a molten metal may not be sufficiently prevented by the gas shielded method, generation of high melting point oxides is inevitable. Thus, the electric resistance welding is not suitable for joining alloy steels such as stainless steels containing alloying components such as Cr and Ni in large amounts (e.g., ferritic stainless steels, austenitic stainless steels, martensitic stainless steels, and dual-phase stainless steels).

Consequently, studies have been conducted on a technology in which a seam of a welded steel pipe is welded by applying a high-energy-density beam (for example, a laser beam or an electron beam). In the welding with a high-energy-density beam, generation of high melting point oxides can be prevented because a molten metal does not contact the atmosphere. However, in the welding with a high-energy-density beam, such a molted metal is formed in an extremely small region. Therefore, if a shift in the circumferential direction is generated between a position to which the high-energy-density beam is applied and a position (hereinafter referred to as "squeezing point") at which longitudinal edges (i.e., opposite ends of a steel strip that is formed into a cylinder) of an open pipe (herein, the term "open pipe" refers to a pipe-shaped steel strip which is formed with multi-stage forming rolls and, the ends of which are not joined. Hereinafter, such a pipe-shaped steel strip is referred to as "open pipe") to which a pressure is applied with squeeze rolls are joined to each other, the joined portion is not melted, and the edges of unmelted portions are left in a seam portion of the welded steel pipe. The portions may be removed as a welding defect. As a result, the yield rate of welded steel pipes decreases.

For example, the technology disclosed in Japanese Unexamined Patent Application Publication No. 3-291176 is a welding technology in which, as illustrated in FIG. 1 of Japanese Unexamined Patent Application Publication No. 3-291176, opposite ends 1-1 of a steel strip 1 formed into a cylinder are preheated using a first heating source 2 (i.e., high-frequency power supply for preheating edges), and then joined by applying a pressure with squeeze rolls 4 while applying a welding heat source 3 (i.e., plasma or laser). By using the first heating source 2 and the second heating source 3 in combination, the welding speed can be improved. However, in Japanese Unexamined Patent Application Publication No. 3-291176, as described in Examples, since the wall thickness t of a steel pipe to be joined is relatively small; 3 mm or less, the preheating temperature determined by the first heating source 2 is specified to be in the range of 200° C. to 600° C. When this technology is applied to welded steel pipes (e.g., UOE steel pipes, spiral steel pipes, and the like) having a large diameter and a large wall thickness t of more than 6 mm, improvement in the welding speed may not be expected at a preheating temperature of about 600° C. In addition, in Japanese Unexamined Patent Application Publication No. 3-291176, in particular, welding defects generated on the inner side of a steel pipe, the welding defects being particularly generated in welding using a high-energy-density heating source such as a laser beam may not be completely removed. Thus, this technology does not also improve the yield rate of welded steel pipes.

The technology disclosed in Japanese Patent No. 1738729 is a welding technology in which, as illustrated in FIG. 3 of Japanese Patent No. 1738729, opposite ends of a steel strip 1 are preheated using a first heating source 10 (i.e., an induction heating coil) at the upstream side (with respect to an advancing direction of a steel pipe) of a point (i.e., V-convergence point P) at which the opposite ends of the steel strip 1 that is formed into a cylinder contact each other with squeeze rolls 11a and 11b for the first time, then irradiated with a second heating source 12 (i.e., a laser beam) at the downstream side of the V-convergence point P, and joined by further pressing with squeeze rolls 13a and 13b. However, the opposite ends of the steel strip 1 are squeezed by the squeeze rolls 11a, 11b, 13a, and 13b with an amount of squeezing with which the squeeze rolls just make the opposite ends contact each other. Accordingly, in Japanese Patent No. 1738729, there may be a problem such as a difficulty of joining the opposite ends of the steel strip due to, for example, spatter generated from the irradiation point of the high-energy-density beam, or the generation of burn through or undercut in the seam. Furthermore, solidification cracking may occur in some components of a steel strip. In addition, in Japanese Patent No. 1738729, in particular, welding defects generated on the inner side of a steel pipe, the welding defects being particularly generated in welding using a high-energy-density heating source such as a laser beam may not be completely removed.

The technology disclosed in Japanese Unexamined Patent Application Publication No. 8-174249 is a welding technology in which, as illustrated in FIG. 1 of Japanese Unexamined Patent Application Publication No. 8-174249, opposite ends of a steel strip formed into a cylinder are preheated using a first heating source 6 (i.e., high-frequency induction heating device), and then joined to each other by applying a second heating source 10 (i.e., a laser beam) and simultaneously applying a pressure with squeeze rolls 4a and 4b. In this technology, the laser beam may be applied near a squeezing point 9. However, it is inevitable that the irradiation point of the laser beam and the energy density vary depending on various factors in a production line of the welded steel pipe, resulting in a problem such as meandering of the seam caused by a variation in the gap between the opposite ends 1a and 1b of the steel strip or by a shift between the irradiation point and the squeezing point 9, the generation of a small defect called spiking caused by variations in the energy density. That is, in Japanese Unexamined Patent Application Publication No. 8-174249, in particular, welding defects generated on the inner side of a steel pipe, the welding defects being particularly generated in welding using a high-energy-density heating source such as a laser beam may not be completely removed.

Furthermore, when a welded steel pipe produced by electric resistance welding is worked (i.e., subjected to secondary working), cracks tend to be generated from, as starting points, segregation lines that are intensively exposed on the outer side and the inner side of the seam of the pipe.

Consequently, Japanese Unexamined Patent Application Publication No. 2006-150412 discloses a technology in which the seam of a welded steel pipe is locally remelted and solidified at the outer and inner sides of the pipe. This technology is usually applied to welded steel pipes produced by publicly known electric resistance welding with a specified depth of remelting, and is not necessarily applied to welded steel pipes welded with a high-energy-density beam. Accordingly, Japanese Unexamined Patent Application Publication No. 2006-150412 does not suggest a method for completely removing welding defects generated on the inner side of a steel pipe, the welding defects being particularly generated in welding using a high-energy-density heating source such as a laser beam.

Therefore, there remains room for improvement to apply the technology disclosed in Japanese Unexamined Patent Application Publication No. 2006-150412 to welded steel pipes welded with a high-energy-density beam.

An aspect of the present invention provides a welded steel pipe that is joined with a high-energy-density beam so that there are no welding defects in the seam. According to another aspect of the present invention, a method for efficiently producing the welded steel pipe is provided.

SUMMARY OF THE INVENTION

According to one aspect, the present invention provides a welded steel pipe, the seam of which is joined by high-energy-density beam welding, including a seam on the outer side of the welded steel pipe, the seam being worked so as to be smooth by cutting excess weld metal of the seam; and a repaired seam on the inner side of the welded steel pipe, the repaired seam being formed by remelting and solidifying a region of the seam, the region having a depth (h) of 0.5 mm or more from the surface, wherein the width WR of the repaired seam is double or more the width WI of the seam on the inner side of the welded steel pipe, and the center line CS of the seam coincides with the center line CSR of the repaired seam.

In the welded steel pipe of the present invention, the high-energy-density beam welding is preferably laser welding.

According to another aspect, the present invention also provides a method for producing a welded steel pipe, the seam of which is joined by welding with a high-energy-density beam, the method including forming a steel strip 1 into a cylindrical open pipe with a forming roll so that opposite ends 1a and 1b of the steel strip 1 face each other, while continuously conveying the steel strip 1; melting the opposite ends 1a and 1b across the entire thickness t by applying a high-energy-density beam 10 while applying a pressure to the open pipe with squeeze rolls 4a and 4b; forming a seam by joining the opposite ends 1a and 1b; removing excess weld metal (also referred to as "bead", "excess weld", or "protrusion", and hereinafter referred to as "bead") of the seam from the outer side and the inner side of the obtained welded steel pipe by cutting; and then forming a repaired seam 12 by remelting and solidifying a region on the inner side of the welded steel pipe, the region having a depth h of 0.5 mm or more from the surface and a width WR of double or more the width WI of the seam on the inner side of the welded steel pipe, wherein the center line CS of the seam is made to coincide with the center line CSR of the repaired seam 12.

In the method for producing a welded steel pipe of the present invention, laser welding is preferably employed as the welding with a high-energy-density beam.

In addition, the repaired seam 12 is preferably formed with another apparatus separate from a production line that continuously produces the welded steel pipe.

Furthermore, prior to the irradiation of the high-energy-density beam, the opposite ends 1a and 1b are preferably preheated to the melting point of the steel strip 1 or lower.

According to aspects of the present invention, a welded steel pipe that is joined with a high-energy-density beam so that there are no welding defects in the seam can be efficiently produced.

REFERENCE NUMERALS

1: steel strip,
1a, 1b: end of steel strip,
4a, 4b: squeeze roll,
6: first heating source,
7: line joining axial centers of squeeze rolls,
8: butt line,
9: squeezing point,
10: high-energy-density beam,
11: seam portion,
12: repaired seam,
13: keyhole,
h: depth of repaired seam 12,
WR: width of repaired seam 12,
WI: width of seam on inner side of laser-welded steel pipe,
t: wall thickness of steel pipe,
CS: center line of seam,
CSR: center line of repaired seam 12,
$\Delta$CS: shift between center line CS of seam and center line CSR of repaired seam 12

DETAILED DESCRIPTION OF THE INVENTION

The inventors of the present invention conducted intensive studies of a technology in which welding defects of a seam of a welded steel pipe welded with a high-energy-density beam are removed by locally remelting and solidifying the seam, and furthermore, cracking of the seam, the cracking being due to secondary working, is reduced or prevented. As a result, it was found that it is advantageous to use cutting in combination with the technology in which a seam of a welded steel pipe welded with a high-energy-density beam is locally remelted.

That is, in a welded steel pipe welded with a high-energy-density beam, excess weld metal (protrusion) (hereinafter referred to as "bead") on a seam on the outer side of the welded steel pipe is removed by cutting to smooth the surface. However, since a molten metal obtained by applying a high-energy-density beam has a small width, unmelted portions generated by spatter or burn through and welding defects such as undercut and porosity which are caused by a variation in the energy density of the high-energy-density beam and cracking of the seam tend to be generated on the inner side of the welded steel pipe. Accordingly, to prevent the generation of such unmelted portions and welding defects, it is advantageous to locally remelt a surface layer portion of the inner side of the pipe after the bead is removed by cutting and to adjust the shape and the position of a site (hereinafter referred to as "repaired seam 12") formed by remelting and solidifying the portion.

The present invention has been made on the basis of the above finding.

Figure 1:
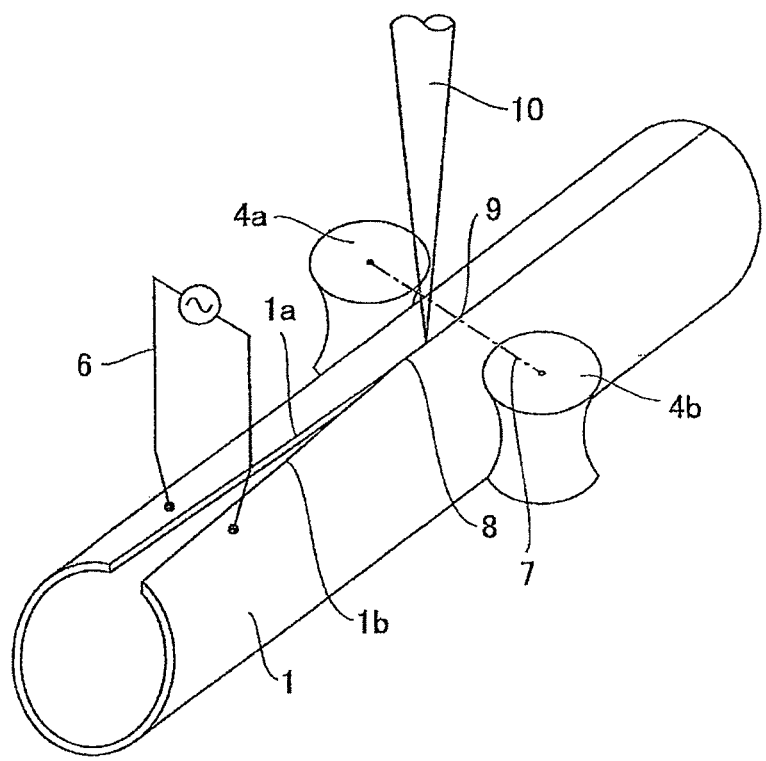
FIG. 1: A schematic view of an embodiment of a production apparatus used in a method according to aspects of the present invention.

As illustrated in FIG. 1, a steel pipe of an embodiment of the present invention is produced by forming a steel strip 1 into a cylinder (so-called open pipe) while continuously conveying the steel strip 1 so that opposite ends 1a and 1b of the steel strip 1 face each other. In an embodiment of the present invention, the opposite ends 1a and 1b can be subjected to high-energy-density beam welding using a first heating source 6 (e.g., high-frequency induction heating or high-frequency resistance heating) without preheating the opposite ends 1a and 1b of the steel strip 1. However, when the opposite ends 1a and 1b are preheated with the first heating source 6, advantages, for example, an improvement in productivity of welded steel pipes can be achieved.

When preheating of the opposite ends 1a and 1b is conducted, the preheating temperature is controlled to be the melting point of the steel strip 1 or lower. However, if the temperature of the steel strip 1 during preheating is too low, the load of a second heating source 10 described below increases and thus productivity of welded steel pipes does not improve. Even when the preheating temperature is the melting point or lower, the effect of increasing the welding speed can be obtained at 600° C. or higher. On the other hand, if the temperature of the steel strip 1 during preheating is too high, the opposite ends 1a and 1b are burned through or deformed, resulting in a decrease in the yield rate of welded steel pipes. Specifically, if the temperature of the steel strip 1 during preheating exceeds 1,200° C., satisfactory welding is difficult to be performed. Accordingly, the temperature of the opposite ends 1a and 1b of the steel strip 1 preheated by the first heating source 6 is preferably in the range of 600° C. to 1,200° C.

Subsequently, a high-energy-density beam 10 (e.g., a laser beam or an electron beam) is applied as the second heating source 10 near an intersection (i.e., squeezing point 9) between a butt line 8 (i.e., the center line of the seam) of the opposite ends 1a and 1b of the steel strip 1 and a line 7 joining axial centers of squeeze rolls 4a and 4b. The irradiation of the high-energy-density beam 10 is conducted while applying a pressure to the open pipe with the squeeze rolls 4a and 4b. However, at the downstream side of the squeeze rolls 4a and 4b (with respect to an advancing direction of the steel pipe), the gap between the opposite ends 1a and 1b is increased by the spring back of the steel strip 1. Therefore, when the high-energy-density beam 10 is applied to the downstream side of the squeezing point 9, a tensile stress acts during solidification of a molten metal 14, whereby a welding defect such as solidification cracking, undercut, or burn through is generated. On the other hand, at the upstream side of the squeezing point 9 (with respect to the advancing direction of the steel pipe), the opposite ends 1a and 1b of the steel strip 1 gradually approach each other. Therefore, when the high-energy-density beam 10 is applied to a portion to which a pressure is applied with the squeeze rolls 4a and 4b, the portion being located at the upstream side of the squeezing point 9, a welding defect such as burn through, undercut, or solidification cracking is not generated. Accordingly, such a portion to which a pressure is applied with the squeeze rolls 4a and 4b, the portion being located at the upstream side of the squeezing point 9, is irradiated with the high-energy-density beam 10.

However, if the high-energy-density beam 10 is applied to a position significantly away from the squeezing point 9 in the upstream direction, a welding defect such as burn through or undercut is generated because the gap (hereinafter referred to as "butt gap") between the opposite ends 1a and 1b of the steel strip 1 is too large. According to studies conducted by the inventors, when the high-energy-density beam is applied under a condition of a butt gap of 0.50 mm or less, and more preferably 0.20 mm or less, welding defects are not generated. The region in which the butt gap is in the range of 0.50 mm to 0.20 mm is located in a region that is about 50 mm to 5 mm from the squeezing point 9 in the upstream direction. Accordingly, the irradiation point of the high-energy-density beam 10 is located at a position preferably 0 to 50 mm and more preferably 0 to 20 mm from the squeezing point in the upstream direction. This region corresponds to a butt gap in the range of 0 to 0.50 mm, and further preferably in the range of 0 to 0.20 mm.

Figure 2:
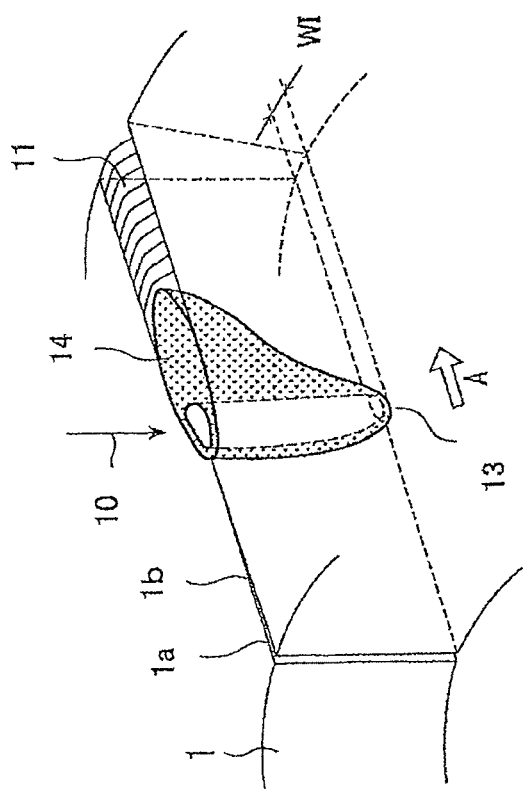
FIG. 2: A perspective view that schematically shows an example in which joining points of edges of an open pipe are melted (welded) across the entire thickness by applying aspects of the present invention.

Irradiation conditions (specifically, the beam spot diameter, the beam power, the welding speed, and the like) of the high-energy-density beam 10 are adequately set in accordance with a thickness t of the steel strip 1 so that the steel strip 1 can be melted across the entire thickness t. For example, FIG. 2 is a perspective view that schematically shows an example in which joining points of edges (ends (1a and 1b) of the steel strip) of an open pipe is melted (welded) by applying an embodiment of the present invention. Arrow A in FIG. 2 indicates an advancing direction of the open pipe. Note that a keyhole 13 generated by the irradiation of the high-energy-density beam 10 and a molten metal 14 formed in the periphery of the keyhole 13 are illustrated as a transparent view. Specifically, by controlling the joining points of the edges to be constantly disposed in the keyhole 13 generated by the irradiation of the high-energy-density beam 10 or the molten metal 14, the steel strip 1 can be melted across the entire thickness t.

A laser beam is preferably used as the high-energy-density beam 10. This is because the irradiation point and the amount of irradiation can be easily adjusted, and the keyhole 13 can be stably maintained.

After the opposite ends 1a and 1b of the steel strip are melted in this manner, the opposite ends 1a and 1b are joined by applying a pressure with the squeeze rolls 4a and 4b to obtain a welded steel pipe. This welding is generally called "one pass butt welding of full penetration".

Since the molten metal 14 has a small width in the welding with the high-energy-density beam 10, an unmelted portion generated by spatter or burn through, undercut, and solidification cracking are readily generated, and in addition, porosity is readily generated by inclusion of a metal vapor or the like. To prevent these welding defects, a pressure is applied with the squeeze rolls 4a and 4b. An index that represents the degree of application of the pressure is an upset distance (When the opposite ends 1a and 1b of the steel strip are aligned and the welding pressure is zero, the upset distance is defined as 0 mm. When a pressure is further applied to the opposite ends 1a and 1b of the steel strip, the amount of pressing is referred to as upset distance). If the upset distance is less than 0.1 mm, the amount of molten metal 14 pushed out from a seam portion 11 is insufficient and thus undercut may not be prevented. On the other hand, if the upset distance exceeds 1.0 mm, most of the molten metal 14 is pushed out from the seam portion 11 and thus the resulting seam significantly protrudes toward the outer side and the inner side, thus forming excess weld metal (bead). Accordingly, even if the bead is removed by cutting to smooth the seam, a hook crack is readily generated. Accordingly, the upset distance is preferably in the range of 0.1 to 1.0 mm.

The region extending from the position of preheating conducted with the first heating source 6 to the squeezing point 9 pressed by the squeeze rolls 4a and 4b is preferably shielded with an inert gas (for example, nitrogen, helium, argon, or the like). The reason for this is to prevent oxidation of the opposite ends 1a and 1b of the steel strip 1 and to prevent inclusion of oxides in the molten metal 14.

Next, excess weld metal (protrusion) (i.e., bead) on each of the outer and inner sides of the seam of the obtained welded steel pipe is removed. The bead is removed by using a usual cutting tool (e.g. a cutter or the like). Specifically, a description will be made with reference to FIGS. 3 and 4, which are cross-sectional views of the seam portion 11.

Figure 3:
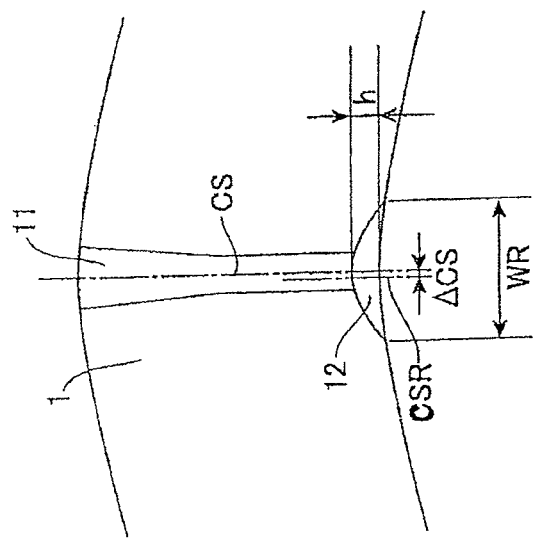
FIG. 3: A cross-sectional view of a seam portion 11 of a laser-welded steel pipe according to an embodiment of the present invention obtained after beads on the outer side and the inner side of the pipe are cut.

As illustrated in the cross-sectional view of the seam portion 11 of FIG. 3, as for the outer side of the welded steel pipe, the seam portion 11 of the outer side of the steel pipe is planarized by removing a bead by cutting.

Figure 4:
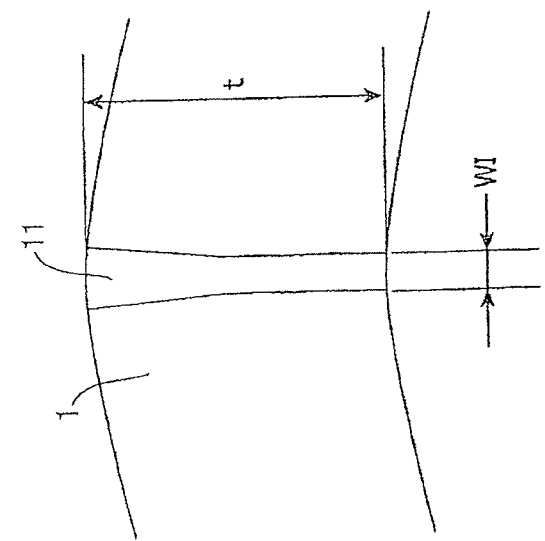
FIG. 4: A cross-sectional view of a seam portion 11 of a laser-welded steel pipe according to an embodiment of the present invention, the welded steel pipe including a repaired seam 12.

However, as for the seam portion 11 of the inner side of the welded steel pipe, an unmelted portion or a welding defect such as undercut or porosity tends to be generated under some irradiation conditions of the high-energy-density beam 10, in particular, when the power or the like of the high-energy-density beam 10 is insufficient. Therefore, even when a bead is removed by cutting, welding defects may remain on the inner side of the welded steel pipe. Consequently, as illustrated in FIG. 4, a site 12 (i.e., repaired seam 12) is formed by locally remelting and solidifying a surface layer portion of the seam on the inner side of the welded steel pipe, thereby removing the welding defects remaining on the seam on the inner side. As a result, during secondary working, it is possible to prevent the generation of cracks in the seam, the cracks being due to the remaining welding defects.

If a depth h of the repaired seam 12 formed on the inner side of the welded steel pipe is less than 0.5 mm, welding defects remaining on the seam on the inner side may not be sufficiently removed. Consequently, during secondary working, cracks are generated in the seam from the welding defects as starting points. Accordingly, the depth h of the repaired seam 12 is preferably 0.5 mm or more. However, if the depth h of the repaired seam 12 is excessively large, a welding defect such as undercut or burn through may be generated. For this reason, the maximum of the depth h of the repaired seam 12 is preferably 40% or less of the wall thickness t of the steel pipe. Specifically, the depth h of the repaired seam 12 is preferably in the range of 0.5 to 5 mm, and more preferably in the range of 0.5 to 2 mm.

In addition, as illustrated in FIG. 4, if a width WR of the repaired seam 12 is less than double a width WI of the seam on the inner side of the welded steel pipe, during secondary working, surface defects exposed to the inner surface of the welded steel pipe become starting points to generate cracks. Accordingly, the width WR of the repaired seam 12 is preferably double or more the width WI of the seam on the inner side of the welded steel pipe. However, if the width WR of the repaired seam 12 is excessively large, a welding defect such as undercut may be generated. For this reason, the width WR of the repaired seam 12 is preferably in the range of 2 to 5 times the width WI of the seam on the inner side of the welded steel pipe. Note that such surface defects exposed to the seam portion 11 on the inner side of the welded steel pipe are generated near the seam mainly because of the rapid melting and solidification phenomena due to the irradiation of the high-energy-density beam 10.

A center line CSR of the repaired seam 12 formed on the inner side of the welded steel pipe is made to coincide with a center line CS of the seam. This is because if the position of the center line CSR of the repaired seam 12 is shifted from the center line CS of the seam (shift: ΔCS) by 5 mm or more, the effect of removing welding defects of the seam from the inner side of the pipe may not be obtained. Accordingly, the shift (ΔCS) between the center lines is preferably 5 mm or less.

As the heating means 10 for forming the repaired seam 12, means in which the heating position and the quantity of heat can be adjusted so that the shape (specifically, the depth and the width) and the position of the repaired seam 12 are maintained within the ranges described above is used. For example, a known technology such as a burner melting method, a laser melting method, a plasma melting method, an electron beam melting method, or a Tungsten Inert Gas (TIG) melting method can be employed.

The heating for forming the repaired seam 12 on the inner side of the welded steel pipe can be performed in the atmosphere. However, in some adopted heating means or heating conditions, oxygen in the atmosphere may be mixed in the repaired seam 12 to produce an oxide. Therefore, it is preferable to heat in an inert gas atmosphere and to perform remelting.

In forming the repaired seam 12 on the inner side of the welded steel pipe, alloying elements may be added using a wire, a flux, an insert material, or the like at the stage of the remelting to further improve material characteristics of the repaired seam 12.

Alternatively, the repaired seam 12 may be formed on a production line that continuously produces the welded steel pipe. However, the formation of the repaired seam 12 may inhibit the operation of the production line, and therefore, from the standpoint of improving productivity of welded steel pipes, it is preferable to form the repaired seam 12 with another apparatus separate from the production line.

Furthermore, a specific seam repairing apparatus preferably includes, for example, a melting device (welding device) configured to remelt an inside seam, the device being provided at a leading end of a boom that can be inserted into the inside of a welded steel pipe, and a seam detector that can follow the inside seam portion 11 by performing an image processing, the inside seam portion 11 being subjected to cutting in advance.

EXAMPLE 1

As illustrated in FIG. 1, each of hot rolled steel strips (thickness: 12 mm) containing components shown in Table 1 was supplied to multi-stage forming rolls (omitted in FIG. 1) and formed into a cylinder so that opposite ends 1*a* and 1*b* of the hot rolled steel strip 1 faced each other. Next, the opposite ends 1*a* and 1*b* of the hot rolled steel strip were preheated by employing high-frequency resistance heating as a first heating source 6. Furthermore, a $CO_2$ laser beam was applied as a second heating source 10 to melt the opposite ends 1*a* and 1*b* of the hot rolled steel strip 1 across the entire thickness t. Furthermore, the opposite ends 1*a* and 1*b* were joined by applying a pressure with squeeze rolls 4*a* and 4*b*. Thus, welded steel pipes (outer diameter: 406 mm) were produced.

The preheating temperature determined by the first heating source 6, the output and irradiation point of the $CO_2$ laser used as the second heating source 10, and the upset distance determined by the squeeze rolls 4*a* and 4*b* are shown in Table 2. As for the irradiation point of the $CO_2$ laser 10, a squeezing point 9 was defined as zero, the downstream side thereof was represented by the plus (+) sign, and the upstream side thereof was represented by the minus (−) sign. In addition, a region that was shielded with an inert gas was a region extending from a position at which the opposite ends 1*a* and 1*b* of the hot rolled steel strip were preheated to a position at which the opposite ends 1*a* and 1*b* were joined using the squeeze rolls 4*a* and 4*b* through the irradiation point of the $CO_2$ laser 10, and the region was shielded with helium gas. The width of the seam was measured by visual inspection as a width of the seam on the inner side of each of the steel pipes obtained after a bead is cut, and calculated as the average of five points of these. The butt gap was determined by taking an image of a butt portion with a camera, performing image processing, and calculating the average.

Beads formed on the outer and inner sides of each of the obtained welded steel pipes were cut with a cutter to make the surfaces smooth by working. Next, each of the welded steel pipes was transferred from a production line to another special apparatus to form a repaired seam 12 on the inner side of the pipes. The melting method for locally remelting a region of the seam and the atmosphere thereof in forming the repaired seam 12 are shown in Table 3. The center line CSR of the repaired seam 12 was made to coincide with the center line CS of the seam (ΔCS=about 0 mm). The depth h and the width WR of the repaired seam 12 are also shown in Table 3. Here, each of the depth h and the width WR of the repaired seam 12 was determined by averaging the values at three points on a cross section of a seam portion 11 of the steel pipes.

Examples 1 to 6 are examples in which the depth h and the width WR of the repaired seam 12 satisfy the preferred ranges of the present invention. Comparative Examples 1 and 3 are examples in which the depth of the repaired seam 12 is out of the preferred range of the present invention, and Comparative Examples 2 and 4 are examples in which the width WR of the repaired seam 12 is out of the preferred range of the present invention.

Next, a test piece was prepared (by cutting a ring having a length of 300 mm) from each of the welded steel pipes, and a flattening test was conducted to examine cracking of the seam. In the flattening test, a ring-shaped test piece (length: 300 mm) was placed so that the central axis of the test piece was oriented in the horizontal direction and the seam was located at an upper position (so that a tensile stress was applied to the seam on the inner side of the welded steel pipe) and was pressed in the vertical direction. Cracking of the seam on the inner side of the welded steel pipe, the cracking being generated in the flattening test, was visually observed. The number of cracks in the seam on the inner side is shown in Table 3.

As is apparent from Table 3, in the flattening test, no cracks in the seam were observed in Examples 1 to 6, whereas 6 to 15 cracks were generated in Comparative Examples 1 to 4.

It was confirmed that welded steel pipes, the seams of which do not have welding defects, can be efficiently produced by applying aspects of the present invention. The welded steel pipes do not have welding defects in the seams thereof, and thus cracks are not generated in the seams even when the welded steel pipes are subjected to secondary working.

EXAMPLE 2

A hot rolled steel strip (thickness: 5 mm) containing components shown in Table 4 was supplied to multi-stage forming rolls and formed into a cylinder so that opposite ends 1*a* and 1*b* of the hot rolled steel strip 1 faced each other. Next, the opposite ends 1*a* and 1*b* of the hot rolled steel strip 1 were melted across the entire thickness using a fiber laser as a second heating source 10 without using a first heating source 6. Furthermore, the opposite ends 1*a* and 1*b* were joined by applying a pressure with squeeze rolls 4*a* and 4*b* to produce a welded steel pipe (outer diameter: 273 mm). The entire length of the seam of the welded steel pipe was 20 m, and the width of the seam on the inner side of the pipe was 0.7 mm (average). The width of the seam, the butt gap, and the depth h and the width WR of the repaired seam 12 were determined as in Example 1.

The output and irradiation point of the fiber laser used as the second heating source 10 and the upset distance determined by the squeeze rolls 4*a* and 4*b* are shown in Table 5. As for the irradiation point of the fiber laser, a squeezing point was defined as zero, the downstream side thereof was represented by the plus (+) sign, and the upstream side thereof was represented by the minus (−) sign. A region extending from the irradiation of the fiber laser to the joining with the squeeze rolls 4a and 4b was shielded with argon gas.

Beads formed on the outer and inner sides of the welded steel pipe were cut with a cutter to make the surfaces smooth by working. Next, the welded steel pipe was transferred from a production line to another special apparatus to form a repaired seam 12 on the inner side of the pipe. The melting method for locally remelting a region of the seam and the atmosphere thereof in forming the repaired seam 12 are shown in Table 6. The center line CSR of the repaired seam 12 was made to coincide with the center line CS of the seam. The depth h and the width WR of the repaired seam 12 are also shown in Table 6. Example 7 is an example in which the depth h and the width WR of the repaired seam 12 satisfy the preferred ranges of the present invention. Comparative Example 5 is an example in which remelting for repairing the seam was not conducted.

Next, ultrasonic inspection test of the seam of each of obtained welded steel pipes was conducted. The ultrasonic flaw detection was conducted in accordance with Japanese Industrial Standards (JIS) G0582 along the entire length of the seam. Relative to an artificial defect of an N5 inner/outer surface notch, the artificial defect being used as a standard, a pipe having a peak height of 10% or less was evaluated as excellent (A ⊚), a pipe having a peak height of more than 10% and 25% or less was evaluated as good (B ◯), a pipe having a peak height of more than 25% and 50% or less was evaluated as pass (C △), and a pipe having a peak height of more than 50% was evaluated as no-good (D ×). The results are shown in Table 6.

As is apparent from Table 6, in Example 7, the generation of welding defects was suppressed by forming the repaired seam 12 on the seam portion 11 on the inner side of the steel pipe.

TABLE 1

| Steel sheet No. | Component (mass %) | | | | | | |
|---|---|---|---|---|---|---|---|
| | C | Si | Mn | P | S | V | Nb |
| 1 | 0.08 | 0.21 | 1.30 | 0.010 | 0.001 | 0.03 | 0.05 |
| 2 | 0.04 | 0.19 | 1.29 | 0.015 | 0.001 | 0.03 | 0.028 |

TABLE 2

| Steel pipe symbol | Steel sheet No. | Welding speed (m/min) | Laser output (kW) | Shielding gas | Preheating temperature (° C.) | Butt gap (mm) | Laser irradiation point (mm) | Upset distance (mm) | Width (WI) of seam (mm) |
|---|---|---|---|---|---|---|---|---|---|
| A | 1 | 10 | 25 | He | 1100 | 0.15 | −2.2 | 0.6 | 0.5 |
| B | 2 | 10 | 25 | He | 900 | 0.1 | −1.5 | 0.4 | 0.7 |

TABLE 3

| | Steel pipe symbol | Conditions for remelting | | Repaired seam | | Depth (h) (mm) | Flattening test Number of cracks (number) |
|---|---|---|---|---|---|---|---|
| | | Method for melting local region | Atmosphere | Shape Width (WR) | | | |
| | | | | Dimension (mm) | Ratio to width of seam* | | |
| Comparative Example 1 | A | TIG melting | Ar | 1.5 | 3.0 times | 0.3 | 9 |
| Example 1 | A | TIG melting | Ar | 2.1 | 4.2 times | 0.5 | 0 |
| Example 2 | A | Plasma melting | Ar | 1.5 | 3.0 times | 0.8 | 0 |
| Example 3 | A | Laser melting | He | 1.0 | 2.0 times | 1.0 | 0 |
| Comparative Example 2 | A | Laser melting | He | 0.8 | 1.6 times | 1.2 | 15 |
| Comparative Example 3 | B | TIG melting | Ar | 3.2 | 4.6 times | 0.3 | 6 |
| Example 4 | B | TIG melting | Ar | 2.5 | 3.6 times | 0.5 | 0 |
| Example 5 | B | Plasma melting | Ar | 1.9 | 2.7 times | 1.0 | 0 |
| Example 6 | B | Laser melting | He | 1.4 | 2.0 times | 1.2 | 0 |
| Comparative Example 4 | B | Laser melting | He | 1.2 | 1.7 times | 1.5 | 11 |

*Ratio to width of seam = Width (WR) of repaired seam/Width (WI) of seam

TABLE 4

| Steel sheet No. | Component (mass %) | | | | | | | | | | |
|---|---|---|---|---|---|---|---|---|---|---|---|
| | C | Si | Mn | P | S | Cr | Ni | Cu | Al | Ti | N |
| 3 | 0.01 | 0.16 | 0.29 | 0.010 | 0.002 | 12.6 | 2.8 | 0.16 | 0.023 | 0.015 | 0.011 |

TABLE 5

| Steel pipe symbol | Steel sheet No. | Outer diameter (mm) | Wall thickness (mm) | Welding speed (m/min) | Laser output (kW) | Shielding gas | Butt gap (mm) | Laser irradiation point (mm) | Upset distance (mm) |
| --- | --- | --- | --- | --- | --- | --- | --- | --- | --- |
| C | 3 | 273 | 5 | 3 | 10 | Ar | 0.12 | −3.5 | 0.7 |

TABLE 6

| | Steel pipe symbol | Conditions for remelting | | | | Result of ultrasonic flaw detection test |
| --- | --- | --- | --- | --- | --- | --- |
| | | Method for melting local region | Atmosphere | Melting width (WR) | Depth (h) of penetration (mm) | |
| Example 7 | C | TIG melting | Ar | 2.0 | 0.6 | A⊚ |
| Comparative Example 5 | C | — | — | — | — | CΔ |

The invention claimed is:

1. A welded steel pipe, the seam of which is joined by high-energy-density beam welding, comprising:
a seam on an outer side and an inner side of the welded steel pipe, the seam being worked so as to be smooth by cutting; and
a repaired seam on an inner side of the welded steel pipe, the repaired seam being formed by remelting and solidifying a region of the seam on the inner side of the welded steel pipe, wherein the repaired seam on the inner side has a depth of from 0.5 mm to 40% or less of the wall thickness of the welded steel pipe, and a width in a range of two to five times the width of the seam on the inner side of the welded steel pipe, and the center line of the seam coincides with the center line of the repaired seam.

2. The welded steel pipe according to claim 1, wherein the high-energy-density beam welding is laser welding.

3. The welded steel pipe according to claim 1, wherein a shift between the center line of the repaired seam and the center line of the seam is 5 mm or less.

* * * * *